(12) United States Patent
de Léon et al.

(10) Patent No.: US 8,726,154 B2
(45) Date of Patent: May 13, 2014

(54) METHODS AND APPARATUS FOR CONTROLLING TRANSITION BEHAVIOR OF GRAPHICAL USER INTERFACE ELEMENTS BASED ON A DYNAMIC RECORDING

(75) Inventors: David de Léon, Lund (SE); Simon Winter, Växjö (SE); Staffan Hjort, Malmö (SE)

(73) Assignees: Sony Corporation, Tokyo (JP); Sony Mobile Communcations AB, Lund (SE)

( * ) Notice: Subject to any disclaimer, the term of this patent is extended or adjusted under 35 U.S.C. 154(b) by 1488 days.

(21) Appl. No.: 11/563,377

(22) Filed: Nov. 27, 2006

(65) Prior Publication Data

US 2008/0126928 A1    May 29, 2008

(51) Int. Cl.
*G06F 3/00* (2006.01)
(52) U.S. Cl.
USPC ........... 715/704; 715/726; 715/744; 715/765; 715/810; 715/863; 715/866; 455/403
(58) Field of Classification Search
USPC ......... 715/726, 810, 704, 863, 744, 765, 866; 345/145
See application file for complete search history.

(56) References Cited

U.S. PATENT DOCUMENTS

| | | | | |
|---|---|---|---|---|
| 5,249,296 A | * | 9/1993 | Tanaka | 715/799 |
| 5,598,187 A | * | 1/1997 | Ide et al. | 345/158 |
| 5,602,566 A | * | 2/1997 | Motosyuku et al. | 345/684 |
| 5,982,389 A | * | 11/1999 | Guenter et al. | 345/474 |
| 6,088,731 A | * | 7/2000 | Kiraly et al. | 709/229 |
| 6,201,554 B1 | * | 3/2001 | Lands | 345/169 |
| 6,229,542 B1 | * | 5/2001 | Miller | 715/782 |
| 6,735,632 B1 | * | 5/2004 | Kiraly et al. | 709/229 |
| 6,760,041 B2 | * | 7/2004 | Komata | 345/660 |
| 6,931,656 B1 | * | 8/2005 | Eshelman et al. | 725/37 |
| 7,139,034 B2 | * | 11/2006 | Kennedy et al. | 348/601 |
| 7,155,676 B2 | * | 12/2006 | Land et al. | 715/731 |
| 7,173,604 B2 | * | 2/2007 | Marvit et al. | 345/156 |
| 7,327,351 B2 | * | 2/2008 | Lee | 345/166 |
| 7,552,403 B2 | * | 6/2009 | Wilson | 715/863 |
| 2002/0024519 A1 | * | 2/2002 | Park | 345/474 |

(Continued)

FOREIGN PATENT DOCUMENTS

| | | |
|---|---|---|
| EP | 1 513 330 A1 | 3/2005 |
| EP | 1 775 712 A1 | 4/2007 |

OTHER PUBLICATIONS

International Search Report, PCT/EP2007/054957, Sep. 26, 2007.

*Primary Examiner* — Patrick Riegler
(74) *Attorney, Agent, or Firm* — Myers Bigel Sibley & Sajovec, P.A.

(57) ABSTRACT

A dynamic recording including transition information is provided. Transition behavior of a graphical user interface (GUI) element on a display of an electronic device, such as a mobile terminal, is defined responsive to the dynamic recording. For example, in some embodiments of the present invention, the dynamic recording may be generated responsive to a sensor of the electronic device, such as an audio sensor, a video sensor and/or a motion sensor. The GUI transition behavior may include, for example, a window transition behavior, a menu transition behavior and/or a dialog transition behavior. The defined GUI transition behavior may include, for example, movement, metamorphosis, shape transition behavior and/or color transition behavior. Apparatus and computer program products configured to perform such operations are provided.

17 Claims, 6 Drawing Sheets

(56) References Cited

U.S. PATENT DOCUMENTS

| | | | |
|---|---|---|---|
| 2002/0039098 A1* | 4/2002 | Hirota | 345/473 |
| 2002/0080239 A1* | 6/2002 | Ikeda et al. | 348/207 |
| 2002/0163533 A1* | 11/2002 | Trovato et al. | 345/728 |
| 2003/0016222 A1* | 1/2003 | Budin et al. | 345/473 |
| 2005/0219223 A1* | 10/2005 | Kotzin et al. | 345/173 |
| 2005/0278634 A1* | 12/2005 | Chen et al. | 715/723 |
| 2006/0046781 A1 | 3/2006 | Barfoed et al. | |
| 2006/0077206 A1* | 4/2006 | Jaeger | 345/475 |
| 2006/0094480 A1* | 5/2006 | Tanaka | 455/575.1 |
| 2006/0187204 A1* | 8/2006 | Yi et al. | 345/158 |
| 2007/0057912 A1* | 3/2007 | Romriell et al. | 345/156 |
| 2007/0058647 A1* | 3/2007 | Bettis et al. | 370/401 |
| 2007/0067745 A1* | 3/2007 | Choi et al. | 715/863 |
| 2007/0162853 A1* | 7/2007 | Weber et al. | 715/719 |
| 2008/0126937 A1* | 5/2008 | Pachet | 715/720 |

* cited by examiner

METHODS AND APPARATUS FOR CONTROLLING TRANSITION BEHAVIOR OF GRAPHICAL USER INTERFACE ELEMENTS BASED ON A DYNAMIC RECORDING

FIELD OF THE INVENTION

The present invention relates to graphical user interfaces for electronic devices, such as mobile terminals, and, more particularly, to control of transition behavior of graphical user interface elements.

DESCRIPTION OF RELATED ART

Mobile terminals (e.g., cell phones) and other electronic devices are playing an increasingly prominent role in the everyday lives of many people. For example, such devices are increasingly being used to support social networks, for example, groups that share particular interests in art, politics, science, and the like, through such mechanisms as chatrooms, instant messaging and weblogs. As such, many users now view their personal electronic devices as extensions of their personality, such that, for example, a mobile terminal or other electronic device may serve as a fashion accessory, a reflection of the user's mood or a badge of membership in a particular affinity group.

Manufacturers and users have developed a variety of techniques for personalizing such devices. For example, mobile terminal manufacturers have developed mobile terminals with an array of different aesthetic features, including fashion housings and faceplates, as well as terminals that have the capability to define user-defined menu palettes and other graphical user interface (GUI) features. For example, U.S. Provisional Application No. 60/728,795, filed Oct. 20, 2005, entitled Theme Creator, describes using a camera in a mobile terminal to support user-defined "themes," e.g., colors and patterns, for a GUI.

SUMMARY OF THE INVENTION

Some embodiments of the present invention provide methods of operating an electronic device. A dynamic recording including transition information is provided. Transition behavior of a graphical user interface (GUI) element on a display of the electronic device is defined responsive to the dynamic recording. For example, in some embodiments of the present invention, the dynamic recording may be generated responsive to a sensor of the electronic device, such as an audio sensor, a video sensor and/or a motion sensor. The GUI transition behavior may include, for example, a window transition behavior, a menu transition behavior and/or a dialog transition behavior. Defining transition behavior of the GUI element may include defining a movement and/or a metamorphosis of the GUI element. The definition may further include defining a shape and/or a color transition behavior of the GUI element responsive to the dynamic recording.

In some embodiments, defining a movement and/or a metamorphosis of the GUI element includes defining a movement and/or a metamorphosis of the GUI element responsive to a first dynamic recording. A shape and/or a color transition behavior of the GUI element may be defined responsive to a second dynamic recording. The first dynamic recording may be motion recording, e.g., a recording generated responsive to a motion detector, such as an accelerometer or rate sensor. The second dynamic recording may be a video recording, e.g., a recording generated responsive to a video sensor, such as a camera.

Further embodiments of the present invention provide electronic devices and computer program products configured to perform the above-described operations.

Still further embodiments of the present invention provide methods of operating a portable electronic device in which a video recording is generated using a camera of the portable electronic device and transition behavior of a GUI element on a display of the portable electronic device is defined responsive to the video recording. Defining transition behavior of a GUI element on a display of the portable electronic device responsive to the video recording may include controlling a movement and/or a metamorphosis of the GUI element responsive to the video recording and/or controlling a shape and/or a color of the GUI element responsive to the video recording.

In additional embodiments of the present invention, a mobile terminal includes a display and a controller configured to control transition behavior of GUI elements on the display responsive to a dynamic recording including at least one transition. In some embodiments, the mobile terminal further includes a camera, and the controller is configured to control transition behavior of GUI elements on the display responsive to a video recording generated by the camera. In some embodiments, the mobile terminal further includes a motion sensor, and the controller is configured to control transition behavior of GUI elements on the display responsive to a dynamic recording generated by the motion sensor.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, an "electronic device" includes, but is not limited to, portable electronic devices, such as mobile terminals, music players, video players, Personal Communications System (PCS) terminals, Personal Digital Assistants (PDA), laptop computers, notebook computers, and handheld computers, as well as fixed-use electronic devices, such as desktop computers. As used herein, a "graphical user interface (GUI) element" includes any graphic element that is used to support user interaction with the electronic device, including, but not limited to, windows, pop-up menus, icons, widgets, dialogs and the like.

Some embodiments of the present arise from a realization that transitional behavior of GUI elements produced on a display of an electronic device, such as a mobile terminal, PDA or other portable electronic device, may be defined according to a video or other dynamic recording that provides transition information that can be used as a model for the GUI transition behavior. According to some embodiments of the present invention, definition of GUI transitional behavior can be made responsive to, for example, a video recording made by a camera of the electronic device. In other embodiments, such transition information may be obtained from another type of sensor, such as an accelerometer or rate sensor. In further embodiments, transition information for defining GUI element transitions may come from a combination of dynamic recordings of different types, such as a combination of a video recording and a motion recording from a motion sensor, such as an accelerometer. Additional shape and color transition information for GUI element transitions may also be obtained from the video recording.

Figure 1:
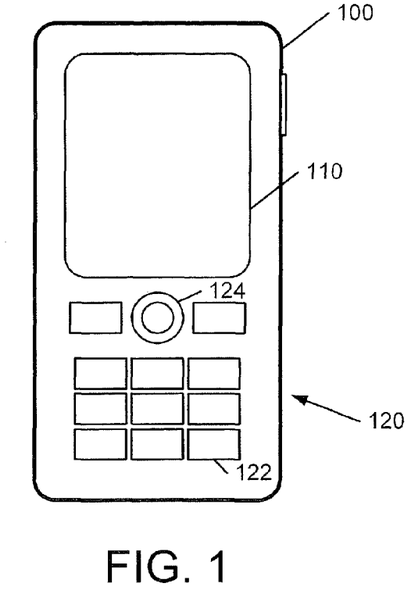
FIGS. 1-3 illustrate a mobile terminal and operations thereof according to some embodiments of the present invention.
Figure 2:
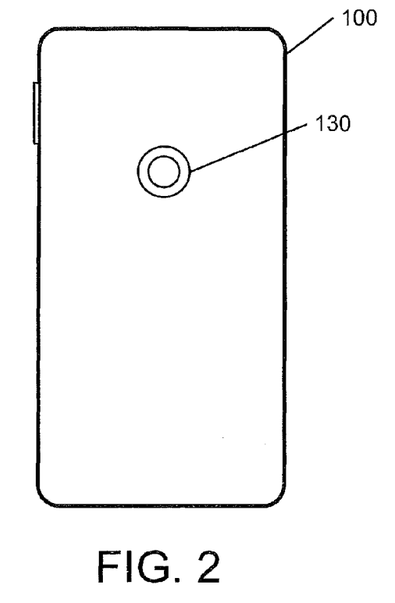
Figure 3:
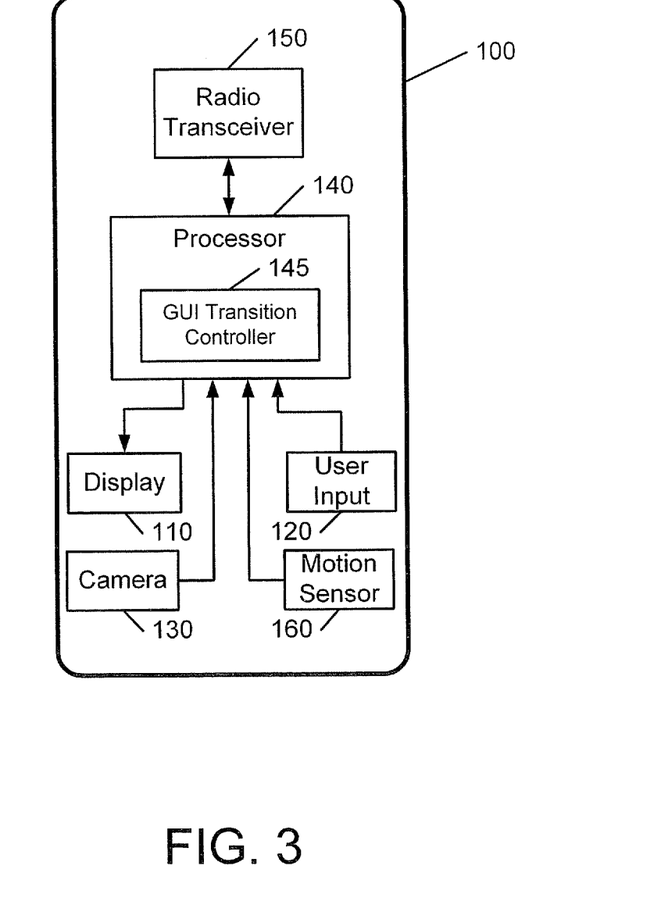

FIGS. 1-3 illustrates a mobile terminal 100 configured according to some embodiments of the present invention. Referring to FIG. 1, the terminal 100 includes a display 110 that is configured to display GUI elements, e.g., menus, windows, icon, widgets, and the like. The terminal 100 further includes user input circuitry 120, here shown as including keys 122 and a joystick 124. It will be appreciated that the user input device 120 may include any of a number of other types of input devices. As shown in FIG. 2, the terminal 100 may also include a camera 130 configured to generate video recordings.

Referring to FIG. 3, the terminal 150 may further include a radio transceiver 150 that is configured to support radio communications of the terminal 100. The radio transceiver 150 is operatively associated with a processor 140, e.g., a microprocessor, microcontroller or other computing device and associated memory (e.g., RAM and/or EEPROM). The processor 140 is also operatively associated with the display 110, user input circuitry 120 and camera 130. As also shown in FIG. 3, the terminal 100 may further include a motion sensor 160, such as an accelerometer and/or rate sensor, which is operatively associated with the processor 140.

As further shown in FIG. 3, the processor 140 may be configured to implement a GUI transition controller 145 that is operative to control transition behavior of GUI elements displayed on the display 110 responsive to a dynamic recording that includes transition information that may be used as a reference for defining GUI transition behavior. For example, in some embodiments, the processor 140 may be configured to store and execute computer program code that, responsive to video information generated by the camera 130 and/or motion information generated by the motion sensor 160, controls GUI element transition behavior. In further embodiments, a dynamic recording (e.g., a video recording) may be obtained in other ways, such as by downloading via the radio transceiver 150. It will be understood that various aspects of GUI element transition behavior, including, but not limited to, movement, sequencing, color transition, texture transition, shape transition and other forms of GUI element metamorphosis may be controlled in this manner.

Figure 4:
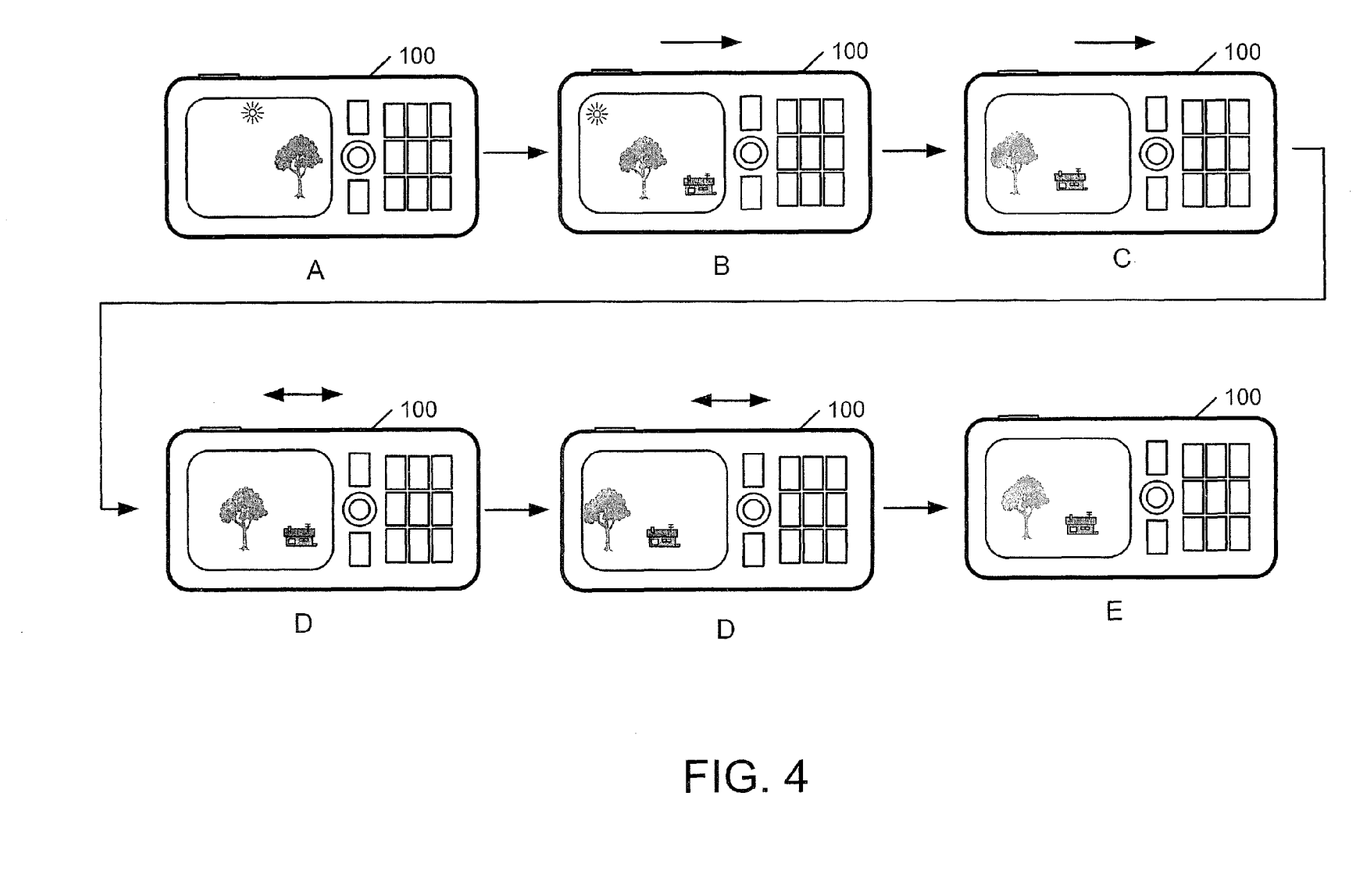
FIGS. 4-6 illustrate operations for capturing a video recording and controlling GUI transition behavior of an electronic device based thereon according to some embodiments of the present invention.

According to some embodiments of the present invention, transition behavior of GUI elements, such as windows, menus, icons, widgets, dialogs and the like, may be defined using a video recording generated by a camera of a mobile terminal. Referring to FIG. 4, the mobile terminal 100 may generate a video recording in which motion in the recorded scene is used to define transition behavior of a GUI element. For example, as shown in FIG. 4, the mobile terminal 100 may support a user-selectable "transition sampling" mode of camera operation, wherein a user makes a menu selection or otherwise initiates generation of a video recording to be used as a basis for defining GUI transition behavior. For example, as shown in FIG. 4, while video recording a substantially fixed scene, the camera may be panned to the right from a position A through positions B and C to a position D, at which point the user may perform rapid back-and-forth movements before ending the recording at a position E, thus defining a transition sequence that includes a continuous movement in one direction, followed by a brief "shudder."

Figure 5:
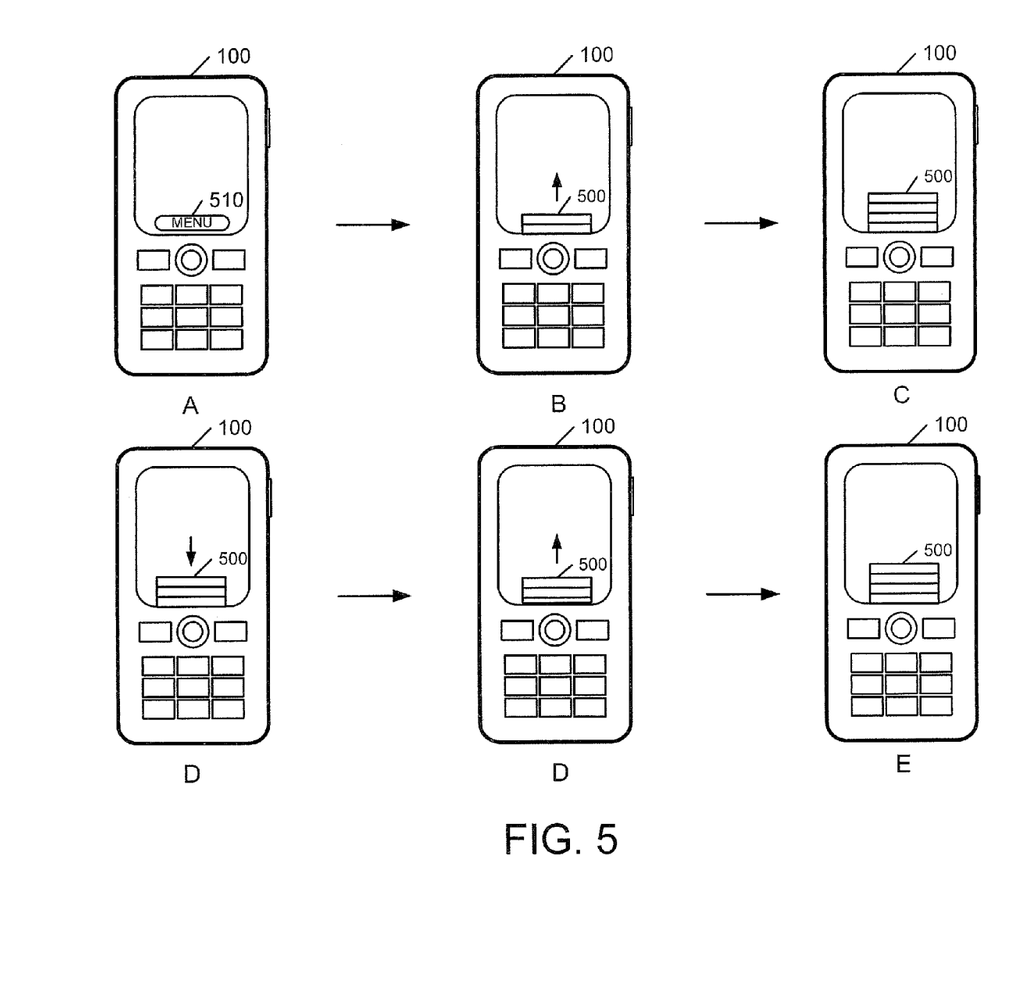

As shown in FIG. 5, the movements recorded in FIG. 4 may then be used, for example, to define transitional behavior of a popup menu 500. For example, from a state A in which a menu selection widget 510 is selected, the menu 500 may rise up from a bottom of the display 110 through states B and C (e.g., corresponding to the camera positions B and C shown in FIG. 4) to a state D, at which point the menu shudders or oscillates in an up-and-down manner that corresponds to the back-and-forth camera movement described with reference to FIG. 4, culminating with the menu stabilizing at a state E, thus mimicking transitional behavior from the video recording. It will be appreciated that the above-described movements are examples, and that a wide variety of other mappings of video motion to GUI element transition may be provided in other embodiments of the present invention.

Figure 6:
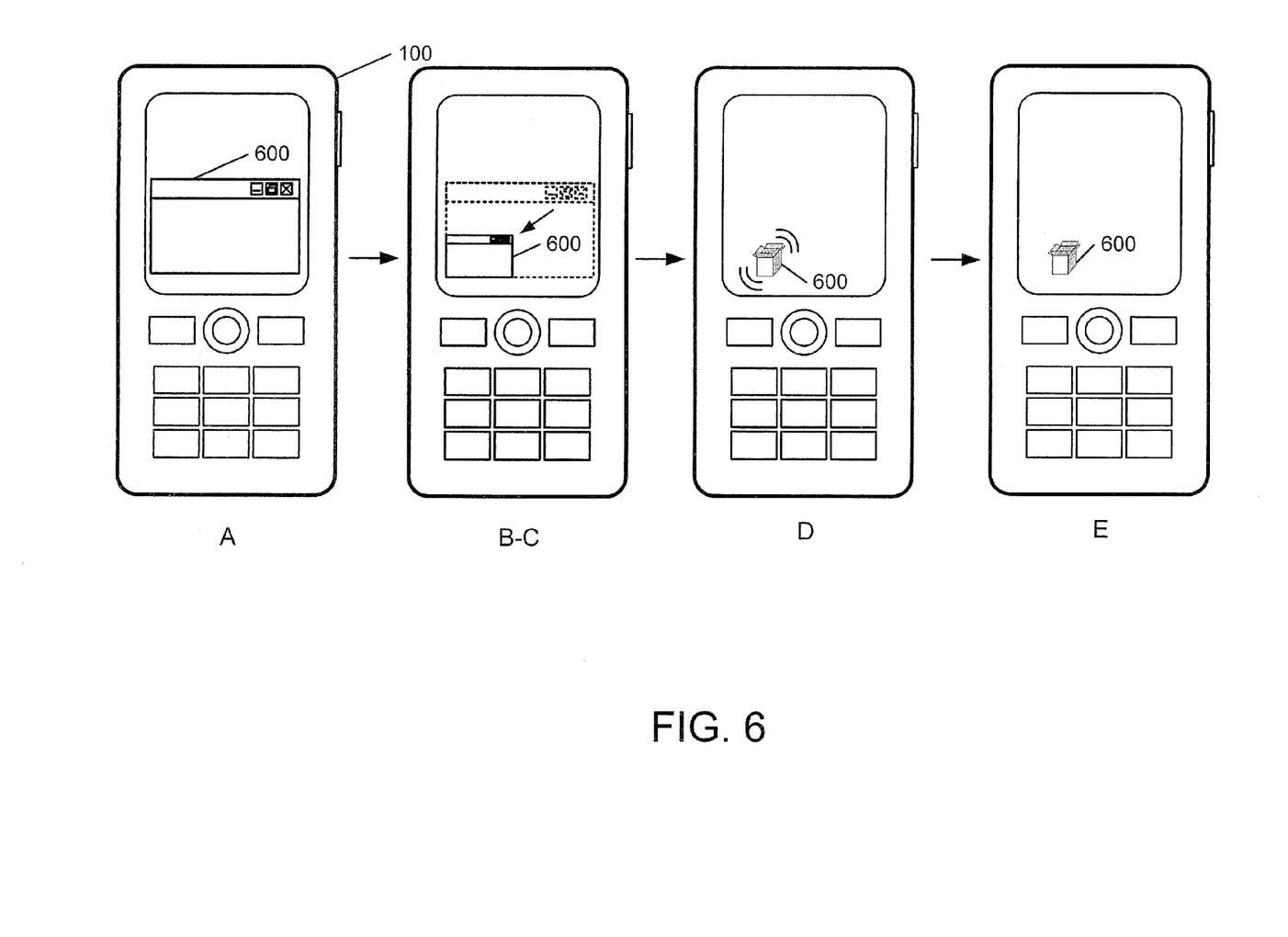

For example, according to further embodiments of the present invention, similar control may be provided for metamorphosis of a GUI element from one form to another. For example, as shown in FIG. 6, a video recording, such as that described above with reference to FIG. 4, may be used to control metamorphosis of a GUI element 600 from a window to an icon. In particular, the GUI element 600, starting from a window form at a state A, may "shrink" through states B, C and then morph to a "shuddering" icon at state D, corresponding to the recorded movement states A-D described above with reference to FIG. 4, with the sequence ending with display of the motionless icon at a state E.

It will be understood that, in some embodiments of the present invention, rather than, or in combination with, moving a camera to generate motion information in a video recording as described above, movements and other characteristics of objects within a video-recorded scene (e.g., movements and textures of clouds, cars around a race track, etc.) may be used as a source of a model for GUI transition behavior. It will be further appreciated that dynamic behavior may be defined using other types of video recordings, such as a downloaded video clip, in a similar manner in other embodiments of the present invention. Information from a video recording may be extracted in any of a number of different ways, such as pattern recognition techniques and/or techniques that involve user identification of particular objects in the video source. In some embodiments, additional video features, such as color transitions, texture transitions, shading transitions, brightness transitions and shape transitions may also be extracted and used in defining GUI transition behavior. For example, color transitions in a video source may be used to define color transitions (e.g., starting and ending colors) of menus, windows, widgets and other GUI elements.

In further embodiments, transition information from another information source, for example, motion information from a motion sensor, such as an accelerometer or rate sensor, may be used instead of, or in conjunction with, transition information from a video source. In still further embodiments of the present invention, GUI transition behavior may be defined from a dynamic recording that provides transition information in the form of sound transitions, such as the tempo from a recording of a song or other audio. A device may also be configured to store multiple GUI transition behavior definitions, such that a user may customize and/or select particular definitions and/or may associate respective GUI transition behavior definitions with respective themes, users, user environments and the like.

Figure 7:
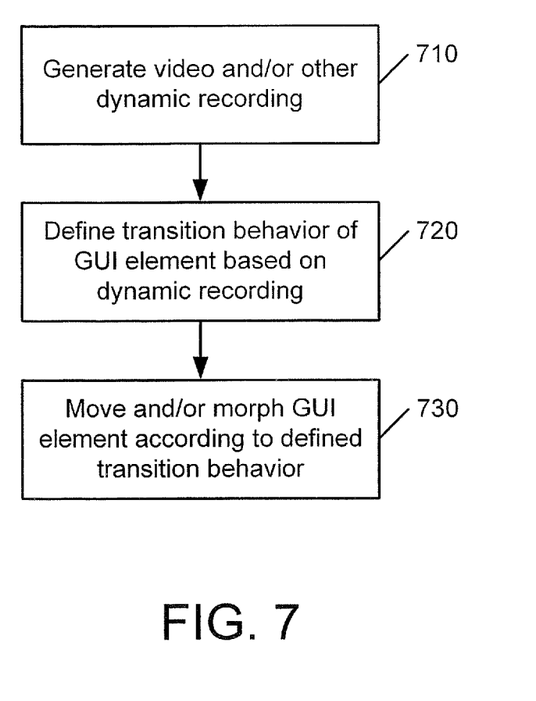
FIG. 7 illustrates operations for controlling GUI transition behavior of an electronic device according to further embodiments of the present invention.

FIG. 7 is a flowchart illustrating exemplary operations for controlling GUI transition behavior according to some embodiments of the present invention. A video and/or other type of dynamic recording including transition information is provided, e.g., generated, downloaded or otherwise obtained (block 710). Transition behavior of a GUI element is defined based on the dynamic recording (block 720). The GUI element is moved and/or morphed according to the defined transition behavior (block 730).

Various embodiments of the present invention have been described above with reference to block diagrams and/or operational illustrations (e.g., flowcharts) illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products. For example, in the embodiments described herein with reference to FIGS. 1-7, such computer program instructions may be provided to a processor configured to control an electronic device, thus supporting, among other things, devices configured to provide the operations described, methods including such operations, and computer program products for performing such operations.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of operating a handheld electronic device, the method comprising:
   placing the handheld electronic device in a first mode of operation responsive to a user selection of the first mode of operation after operation in a second mode of operation in which a first animation is applied to a graphical user interface (GUI) element on a display of the electronic device;
   generating a dynamic recording including transition information relating to a series of physical inputs to the handheld electronic device responsive to a sensor of the handheld electronic device while in the first mode of operation;
   placing the handheld electronic device in the second mode of operation after terminating generation of the dynamic recording; and
   generating and applying a new second animation that reflects the transition information included in the dynamic recording to the GUI element on the display of the electronic device in the second mode of operation of the handheld electronic device based on the dynamic recording generated while the handheld electronic device was in the first mode of operation,
   wherein generating and applying a new second animation comprises defining a window transition behavior, a menu transition behavior and/or a dialog transition behavior.

2. The method of claim 1, wherein the sensor comprises an audio sensor, a visual sensor and/or a motion sensor.

3. The method of claim 1, wherein generating and applying a new second animation comprises defining a movement and/or a metamorphosis of the GUI element.

4. The method of claim 3, wherein generating and applying a new second animation further comprises defining a shape and/or a color transition behavior of the GUI element responsive to the dynamic recording.

5. The method of claim 3, wherein defining a movement and/or a metamorphosis of the GUI element comprises defining a movement and/or a metamorphosis of the GUI element responsive to a first dynamic recording and further comprising defining a shape and/or a color transition behavior of the GUI element responsive to a second dynamic recording.

6. The method of claim 5, wherein the first dynamic recording comprises a non-video recording and wherein the second dynamic recording comprises a video recording.

7. The method of claim 5, further comprising defining movement and/or metamorphosis of the GUI element responsive to the second dynamic recording.

8. An electronic device comprising a processor configured to perform the method of claim 1.

9. A computer program product comprising computer program code embodied in a non-transitory storage medium, the computer program code comprising program code configured to perform the method of claim 1.

10. A method of operating a portable electronic device, the method comprising:
    placing the portable electronic device in a first mode of operation responsive to a user selection of the first mode of operation after operation in a second mode of operation in which a first animation is applied to a graphical user interface (GUI) element on a display of the electronic device;
    generating a video recording using a camera of the portable electronic device in the first mode of operation;
    placing the portable electronic device in the second mode of operation after terminating generation of the dynamic recording; and
    generating and applying a new second animation that reflects the transition information included in the dynamic recording to the GUI element on the display of the portable electronic device in the second mode of operation of the portable electronic device based on the video recording generated while the portable electronic device was in the first mode of operation, wherein generating and applying a new second animation comprises defining a window transition behavior, a menu transition behavior and/or a dialog transition behavior.

11. The method of claim 10, wherein generating and applying a new second animation comprises controlling a movement and/or a metamorphosis of the GUI element responsive to the video recording generated while the portable electronic device was in the first mode of operation.

12. The method of claim 11, further comprising controlling a shape and/or a color of the GUI element responsive to the video recording.

13. A portable electronic device comprising a processor configured to perform the method of claim 10.

14. A computer program product comprising computer program code embodied in a non-transitory storage medium, the computer program code comprising program code configured to perform the method of claim 10.

15. A mobile terminal, comprising:
a display;
a sensor;
and a controller configured to place the mobile terminal in a first mode of operation responsive to a user selection of the first mode of operation after operation in a second mode of operation in which a first animation is applied to a graphical user interface (GUI) element on a display of the electronic device, to generate a dynamic recording including transition information relating to a series of movements responsive to the sensor while the mobile terminal is in the first mode of operation, to place the mobile terminal in the second mode of operation after terminating generation of the dynamic recording and to generate and apply a new second animation that reflects the transition information included in the dynamic recording to the GUI element on the display in the second mode of operation of the mobile terminal based on the dynamic recording generated while the mobile terminal was in the first mode of operation, wherein generating and applying a new second animation comprises defining a window transition behavior, a menu transition behavior and/or a dialog transition behavior.

16. The mobile terminal of claim 15, further comprising a camera, wherein the controller is configured to control transition behavior of the GUI element on the display responsive to a video recording generated by the camera.

17. The mobile terminal of claim 15, further comprising a motion sensor, and wherein the controller is configured to control transition behavior of the GUI element on the display responsive to a dynamic recording generated by the motion sensor.

* * * * *